Aug. 6, 1957 — L. J. STREET — 2,801,651
FILLING STRUCTURE
Filed Dec. 28, 1954 — 2 Sheets-Sheet 1

FIG. 1

INVENTOR
Lloyd J. Street
BY Cushman, Darby & Cushman
ATTORNEYS

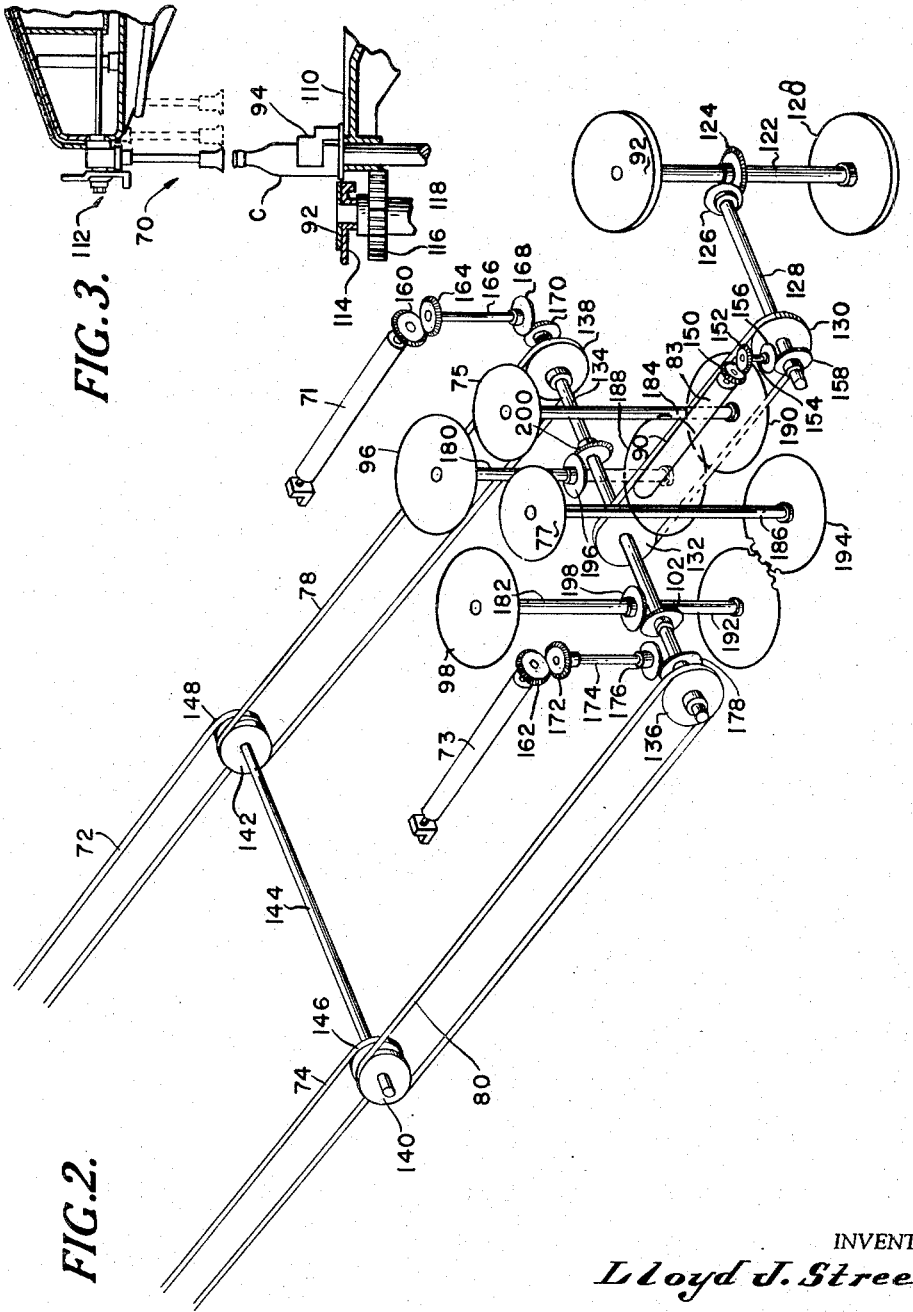

United States Patent Office 2,801,651
Patented Aug. 6, 1957

2,801,651

FILLING STRUCTURE

Lloyd J. Street, Bethesda, Md., assignor to Crown Cork & Seal Company, Inc., Baltimore, Md., a corporation of New York Application December 28, 1954, Serial No. 477,992

8 Claims. (Cl. 141—4)

The present invention relates to a filling structure and, more particularly, to a mechanism for moving containers to and positioning containers on filling machines in a desired sequence.

The present invention is an improvement of the filling structure disclosed in Rudolph H. Breeback's applications Serial No. 399,998, filed December 23, 1953, and entitled "Container Feeding Mechanism," and Serial No. 478,079, filed December 28, 1954, and entitled "Filling Structure."

The aforementioned copending applications pertain to details of the mechanisms for feeding containers to and from filling machines. Therefore, it will suffice to say that the subject matter of the aforementioned applications, which is not repeated herein, may be used with the present invention and to that extent would form a part of the present disclosure.

The feeding of bottles and cans smoothly between various machines in a bottling plant involves substantial difficulty, particularly if single machines for performing one operation receive containers from a plurality of machines for performing another operation. For example, if a rotary filling machine is able to fill at a rate of 400 containers per minute, but it is necessary to deliver empty containers thereto from two bottle washers or soakers, each with a capacity of approximately 200 bottles per minute, the two lines of bottles from the washers or soakers must be smoothly placed in a single line for delivery to the rotary filling table of the filling machine. Since the combining lines of containers are moved at relatievly high speeds, for example 400 containers per minute, the problem of combining the containers is critical. Intermittent contact of containers while moving at such high speeds may cause the containers to be upset, marred, or abraded. The aforementioned copending applications of Rudolph H. Breeback disclose mechanisms for substantially eliminating the problem of combining containers from separate sources at high speeds.

Another aspect in the problem of feeding containers from separate sources to rotary filling machines arises when the commodity being filled into the containers is a carbonated beverage, such as beer or the like. In more detail, if the supply of containers is temporarily interrupted at one of the sources, such as the washer or soaker, the filling machine will continue its operation at a reduced output as it will have a number of filling heads with no containers beneath them for filling. The beer in these filling heads, if the filling machine makes a number of revolutions, will become warm and, consequently, when full operation is resumed, the warm beer moving from the filling heads into the containers will foam causing an improper fill. Heretofore, when such condition arose, it was necessary for the operator to remove all filled containers from the discharge line for a period of at least one revolution of the filling machine as there was no way of knowing which containers were filled with warm beer.

In the aforementioned Breeback application Serial No. 478,079, means was disclosed for specifically placing the containers from one source of supply on a series of predetermined filling heads while placing the containers from the other source of supply on another series of filling heads. Consequently, it was only necessary for the operator to remove containers from the filling heads of the filling machine which were supplied by the source that had previously been stopped.

The present invention completely eliminates the necessity of having to check containers on the heads of the filling machine when operation is resumed after a temporary stoppage of containers from any of the sources of supply.

Therefore, an object of the present invention is to provide a container feeding mechanism to deliver containers to a rotary filling table from two or more different sources and which mechanism is so synchronized with respect to the rotary table that containers moving from one source will be delivered to one series of platforms and filling heads of the rotary table during one revolution of the table and to another series of platforms and filling heads during a successive revolution of the rotary filling table.

Still another object of the invention is to provide a container feeding mechanism to deliver containers alternately from two or more sources to a rotary filling table, the containers from one source being delivered to alternate platforms of the filling machine during one revolution of the filling table and to those platforms of the filling machine not previously used during a succcessive revolution of the filling table.

A still further object of the present invention is to provide a transfer mechanism which is so designed that once articles have been placed in a desired relative arrangement, for example, spaced apart, they will be maintained in that arrangement when placed on a rotary filling table.

Still another object of the present invention is to provide a transfer mechanism coupled with a rotary filling machine which is particularly effective in continuous filling of containers with a carbonated liquid such as beer.

A further object of the present invention is to provide a transfer mechanism coupled with a rotary filling table which will deliver and receive containers from separate sources efficiently and at a high capacity. The arrangement is such as to eliminate loss of time of resuming full operating capacity and/or loss of liquid after temporary discontinuance of one source of supply.

These and other objects and advantages of the invention will be apparent from the following description, claims, and accompanying drawing.

Figure 1 is a plan view of a schematic representation embodying the present invention.

Figure 2 is a perspective view of a schematic representation of the various drives for driving the conveying elements, dials, and article-positioning means of the present invention; and Figure 3 is a fragmentary sectional view of a typical filling machine showing the filling heads and container supporting platforms.

Referring specifically to the drawing, a pair of washers, soakers or the like, and generally indicated A and B, are provided for supplying containers, such as bottles or cans, to a rotary filling machine generally indicated by the numeral 70. The washers or soakers A and B are of the usual type and are adapted to deliver containers therefrom at the rate of approximately 200 or more containers per minute. On the other hand, filling machine 70 is adapted to fill approximately twice the number of containers supplied by the units A and B or, in other words, approximately 400 containers per minute.

Container conveying elements 72 and 74 feed containers in a straight line from the units A and B, respectively. The container conveying elements 72 and 74, which form part of a first conveyor means, are straight line endless link type conveyors formed of flat plates and are suitably journalled at their outfeed ends in the upper surface of table structure 76. Also mounted in the top surface of table structure 76 are a pair of conveying elements 78 and 80, which travel at the same linear speed as the conveying elements 72 and 74 and receive containers, respectively, from the conveying elements 72 and 74. Suitable guides 82 and 84 having deflector portions 86 and 88 are provided for guiding the containers from the units A and B to the conveying elements 78 and 80, respectively. Conveying elements 78 and 80, which also form part of the first conveyor means, are similar in structure to the conveying elements 72 and 74 in that they also are straight line endless link type conveyors formed of flat plates.

Intermediate of and parallel to conveying elements 78 and 80 is a take-off conveying element 90 which receives containers from either or both of the conveying elements 78 and 80. Conveying element 90 operates at a linear speed substantially twice that of conveying elements 78 and 80 or, in other words, at approximately 400 containers per minute. Conveying element 90 delivers containers to an infeed dial 92 on the beverage filling machine 70 and places the containers upon the usually vertically movable container supporting platforms 94 of the rotary filling machine 70. The filling machine 70, which may be of the type disclosed in United States Patent No. 2,202,033, issued May 28, 1940, to Robert J. Stewart and Wiltie I. Gladfelter, includes a filling head generally indicated at 112 mounted above each of the container supporting platforms 94, the containers C being received by the platforms 94 and vertically moved into engagement with the filling heads 112. As the rotary table rotates the platforms 110 and the filling heads 112 about a vertical axis with respect to the stationary base structure 114, the containers C are filled in the usual manner, as described in the aforementioned Stewart and Gladfelter patent.

Infeed dial 92 also is journalled for rotation in the base structure of the filling machine and it will be understood that the right hand portion of the conveying element 90 is suitably mounted in the base structure of the filling machine so that the upper run of the conveying element will move across the top surface of the work table of the filling machine.

Conveying element 78 delivers containers from source A to a pocketed dial 96 rotatable above the upper surface of table structure 76. The other conveying element 80 delivers containers from source B to a similar pocketed dial 98 also journalled in the table structure 76. Suitable stationary guides 100 and 102 extending along the length of conveying elements 78 and 80 and terminating immediately in advance of the dials 96 and 98 are provided in addition to the guides 82 and 84. Each of the conveying elements 78 and 80 is provided with container spacing devices 71 and 73, respectively, the devices extending along the length of the conveying element immediately in advance of dials 96 and 98. These spacing devices may be of conventional design or of the structure disclosed in the application for "Article Feeding Mechanism" of Carl L. Day and Rudolph H. Breeback, filed June 6, 1951, Serial No. 230,192, now Patent No. 2,730,226, dated January 10, 1956, and are adapted to progressively space apart the containers moving in contact therewith. The feed screws 71 and 73 will space the containers travelling on conveying elements 78 and 80 so that they will be properly spaced to be received in the pockets of the dials 96 and 98, respectively.

The feed screw 71 and the dial 96 are symmetrically out of phase with the feed screw 73 and the dial 98, thus, the dial 96 will receive a container at a time point which is midway between the time when the dial 98 receives two immediately successive containers. Dials 96 and 98 deliver the containers to an additional pair of dials designated 75 and 77, respectively. Dials 75 and 77 are positioned on opposite sides of the center line of the conveying element 90 just as are dials 96 and 98 and, further, it will be noted that the dials 96, 98, 75 and 77 have the same pitch diameter so that containers move about all of the dials on a like radii. Dials 96 and 98 are provided with five equidistantly spaced pockets while 75 and 77 are provided with ten equidistantly spaced pockets.

It will be clear from the drawing that a container positioned at C1 in the pocket of dial 96 will move with the dial along the stationary guide 79 until it reaches a position C2 where it will be under the control of both the dials 96 and 75. Dial 75 will then take over and carry the container along a stationary guide 81 to a position where the container will be engaged by a pocket of the dial 77. At this position the container will be centered on conveying element 90 ready to be transferred therefrom to the platforms 94 of filling machine 70.

At the same time that the dials 96 and 75 are moving the container discussed immediately above, the dials 98 and 77 will be moving the containers shown in dotted lines from source B so as to alternately position them between the containers shown in full lines. In other words, containers being transferred by dial 77 from dial 98 will be encompassed by the alternate unoccupied pockets of dial 75, as shown at C3.

Since the pockets of dials 75 and 77 move in registry and are so designed that containers moving therewith will have their vertical axis spaced in accordance with the spacing between axis of containers on the platforms 94 of the filling machine 70, a feed screw 83 is provided along one side of conveying element 90 so as to maintain this spacing until the containers are received in the pockets of infeed dial 92 of the rotary filling machine 70. Feed screw conveyor 83 is similar to the screws 71 and 73 except that the groove of its helical thread is of uniform pitch throughout its length so as to maintain the spacing between containers constant.

The rotary table and superstructure 110 of filling machine 70 are driven in the usual manner by a drive gear 116 which engages a ring gear 118 mounted on the rotary table. As shown in United States Patent No. 2,266,497, issued December 16, 1941, to George J. Huntley and Robert J. Stewart, the drive gear 116 may also mesh and drive a gear 120 mounted on a shaft 122 rotatable in the stationary base structure 114 of the filling machine. The infeed dial 92 is mounted on the upper end of shaft 122 and thus is driven in timed relationship with the rotation of the filling table 110. The infeed conveyor 90 is conventionally driven off of the shaft 192 as shown in the aforementioned Huntley and Stewart patent. In more detail a pinion gear 124 provided on shaft 122 is adapted to mesh with a pinion gear 126 carried on a shaft 128 rotatably journaled in the base structure 114 of the filling machine. Shaft 128 is provided with a drive gear 130 about which passes the endless conveying element 90.

The conveying elements 72, 74, 78 and 80 are driven in a conventional manner and at a constant speed in properly timed relationship to the other elements of the transfer mechanism and the filling table 110, as shown schematically in Figure 3. This drive is similar to the drive in the aforementioned Rudolph H. Breeback application, Serial No. 478,079. Gear 132, which receives the other end of endless conveying element 90, is mounted on a shaft 134 which is provided with the gears 136 and 138. One end of the conveying element 80 passes around gear 136, whereas one end of the conveying element 78 passes around gear 138. Gears 140 and 142, carried by a shaft 144, receive the other ends of endlesss conveying elements 80 and 78 respectively. Shaft 144 also carries gears 146 and 148 which receive and drive the conveying elements 74 and 72 respectively at the same lineal speed as the conveying elements 80 and 78.

Feed screw 83 is provided at one end thereof with a beveled gear 150 which meshes with a beveled gear 152. Beveled gear 152 is on a shaft 154 having a beveled gear 156 at its lower end, the beveled gear 156 meshing with a beveled gear 158 carried by shaft 128. Feed screws 71 and 73 may be driven in a manner similar to feed screw 83. In more detail the feed screws 71 and 73 are provided with beveled gears 160 and 162 respectively. The beveled gear 160 meshes with a beveled gear 164 carried on a shaft 166. On the lower end of shaft 166 a beveled gear 168 meshes with a beveled gear 170 carried on the shaft 134. Beveled gear 162 of feed screw 73 meshes with a beveled gear 172 carried on the upper end of the shaft 174. The lower end of the shaft 174 carries a beveled gear 176 which meshes with a beveled gear 178 also carried on the shaft 134.

Dials 96 and 98 are rotatably mounted on shafts 180 and 182 respectively, whereas the dials 77 and 75 are mounted on shafts 184 and 186, respectively. The lower ends of shafts 180 and 184 are provided with meshing gears 188 and 190 respectively so that when the shaft 180 is turned the shaft 184 will also turn. Shafts 182 and 186 are provided with gears 192 and 194 respectively so that when shaft 182 is rotated the shaft 186 will also rotate.

Shafts 180 and 182 are each provided with beveled gears 196 and 198 respectively, the beveled gears meshing with beveled gears 200 and 202 carried by the shaft 134.

The above description of the drive for the various conveying elements, feed screws and dials is, as previously mentioned, conventional and similar to that disclosed in the aforementioned Breeback application, Serial No. 478,079. The take-off from the drive of the filling machine is conventional and may be of the type as disclosed in the aforementioned Huntley and Stewart patent.

Filling machine 70, of Figure 3 differs from the usual rotary filling machine only in that it is provided with an odd number of filling heads and a corresponding odd number of container supporting platforms 94 as shown schematically in Figure 1. The purpose of providing an odd number of filling heads and container supporting platforms will appear more clearly later in the specification.

The operation of the structure described above is as follows.

In normal operation containers will be fed continuously from the container washers or soakers A and B in lines on conveyors 72 and 74 to the combining device. The containers are then transferred from the infeed conveyors to the conveying elements 78 and 80 where they are spaced by the feed screws 71 and 73, respectively, for reception by the dials 96 and 98. Combining of the lines of containers is caused by the cooperative movement of dials 96, 98, 75 and 77 in the direction indicated by arrows on the drawing.

Assuming that the capacity of filling machine 70 is 400 containers per minute, and that the washers or soakers A and B are 200 or more containers per minute, then the linear speed of conveyors 72, 74, 78 and 80 is approximately 200 containers per minute, whereas the speed of the take-off conveyor 90 on which the containers are combined is 400 containers per minute. Since dials 96, 98, 75 and 77 are positively driven in timed sequence with the rotation of the filling table of filling machine 70, containers will be alternately combined on take-off conveyor 90. In other words, first a container from conveying element 78 is transferred onto conveying element 90 and then a container from conveyor 80 is transferred onto conveyor 90.

Once the containers are placed on conveying element 90 in the desired sequence mentioned above and in proper spaced relationship with each other, they are maintained in proper spaced relationship on the conveying element by means of the feed screw 83 until they reach infeed dial 92 where they are transferred onto the container supporting means 94 of the rotating filling table. The containers are then filled with a carbonated beverage and are then transferred from the rotating filling table by an outfeed dial 85 which in turn transfers the containers to a capping or container sealing machine, generally indicated at 87.

Since the container combining mechanism operates in synchronism with dial 92 and the rotary filling table of filling machine 60, and since there are only an odd number of filling heads and container supporting means on the rotary filling table, the containers from one washer will be fed to a predetermined series of filling heads during one revolution of the filling table and to another predetermined series of filling heads during a successive revolution of the filling table. For example, assuming that the rotary filling table includes sixty-one filling heads and container supporting platforms 94, containers received from washer or soaker A and indicated by solid lines would be transferred through the combining mechanism and onto the odd numbered supporting platforms, such as 1, 3, 5, etc. During one complete revolution of the filling table, this condition of placing containers from washer or soaker A on the odd numbered filling heads will continue but during a successive revolution of the filling table the containers from washer or soaker A will be placed on the even numbered container supporting platforms, such as 2, 4, 6, etc. Likewise, during the first revolution of the filling machine, the containers from washer or soaker B, which are shown in dotted lines, would first be placed on the even numbered container supporting platforms and then during a successive revolution of the filling table, on the odd numbered filling platforms.

If one of the sources of supply is temporarily interrupted, the same sequence will take place as previously mentioned with the exception that every other container supporting platform will not receive a container. However, since the spacing of containers is maintained when the containers pass through the combining mechanism, the containers will be first delivered to one series of platforms during one rotation of the rotary filling table and then to another series of platforms during a successive revolution of the filling machine. Consequently, a filling head will make only one revolution without having a container thereneath to be filled. The time required for the rotary filling table to make one revolution is not long enough to cause the carbonated beverage in the filling head to heat up and, consequently, there will be no foaming in the head when it is operated on a successive revolution. When full capacity of washers A and B is resumed, there is no necessity to remove filled containers from the take-off conveyor of the filling machine as the filling machine will not have had the chance to have any of its filling heads warm up and, consequently, foaming is substantially eliminated.

The terminology used in the specification is for the purpose of description and not limitation, the scope of the invention being defined in the claims.

I claim:

1. A method of feeding containers to and positioning containers on platforms of a rotary filling machine and then filling the containers with a carbonated liquid comprising utilizing separate sources of supply of containers, transferring containers from one of the separate sources of supply to a series of predetermined platforms of the filling machine during one revolution of the filling machine and to a second different series of platforms of the filling machine during a successive revolution of the filling machine, and filling the containers with the carbonated liquid while on the platforms of the filling machine.

2. A method of feeding containers to and positioning containers on platforms of a rotary filling machine and then filling the containers with a carbonated liquid comprising utilizing separate sources of supply of containers, transferring containers from the separate sources of supply in lines to a combining point, sequentially combining the containers from the lines of containers into a single line of containers, rotating the filling machine in relation to the combining of the lines of containers into a single line of containers, transferring the containers from the single line of containers onto platforms of the rotating filling machine in sequence so that containers from one of the sources of supply will be fed to a first series of platforms during one revolution of the filling machine while containers from the other source of supply will be fed to a second different series of platforms during the same revolution of the filling machine and during a successive revolution of the filling machine, the containers from the first source of supply will be fed to the second series of platforms while the containers from the second source of supply will be fed to the first series of platforms, and filling the containers with the carbonated liquid while on the platforms.

3. A method of feeding containers to and positioning containers on platforms of a rotary filling machine and then filling the containers with a carbonated liquid comprising utilizing a first source of supply and a second source of supply of containers, transferring containers from the first source of supply to a first series of alternate platforms on the rotary filling machine during one revolution of the filling machine and to a second different series of alternate platforms during a successive revolution of the filling machine, transferring containers from the second source of supply to the second series of alternate platforms of the rotary filling machine during the first revolution of the rotary filling machine and to the first series of alternate platforms during a successive revolution of the filling machine, and filling the containers with the carbonated liquid while on the platforms.

4. In combination, a rotary filling table including a plurality of filling heads and container supporting means beneath the filling heads, separate sources of supply for containers, means to deliver containers from said separate sources of supply to the container supporting means for filling, said last-mentioned means including means to combine containers in such relation with the travel of said filling table that containers from one of said separate sources of supply are delivered to a series of predetermined filling heads during one revolution of the filling table and to a second series of filling heads during a successive revolution of the filling table.

5. In combination, a rotary filling table including a plurality of filling heads and container supporting means beneath the filling heads, separate sources of supply for containers, means to deliver containers from the separate sources of supply to the container supporting means for filling, said last-mentioned means including means to combine containers in such relation to the travel of said filling table that containers from one of said sources of supply are delivered to a first series of filling heads including every other filling head during one revolution of the filling table and to a second series of filling heads including filling heads between filling heads of said first series during a successive revolution of the filling table.

6. In combination, a rotary filling table including an odd number of filling heads and a container supporting means beneath each of the filling heads, separate sources of containers, means to deliver containers from the separate sources of containers to the container supporting means for filling, said last-mentioned means including means to combine containers in such relation with the travel of said filling table that containers from one of said sources will be delivered to alternate filling heads during a revolution of the filling table and to the other filling heads during a successive revolution of the filling table.

7. In combination, a rotary filling table including an odd number of filling heads and container supporting means beneath each of the filling heads, separate sources for containers to be filled, a combiner device for combining a line of containers from one of said separate sources with a line of containers from the other of said separate sources into a single line, said combiner device including means to alternately convey containers from said separate sources into the single line when said sources are continuously delivering containers, means receiving containers from said combiner device, said last-mentioned means maintaining containers in a predetermined position with respect to each other after they are received from said combiner device, means to transfer containers from said last-mentioned positioning means to said container supporting means where the containers are filled, and said combiner device and said positioning means being driven in synchronism with the travel of said filling table.

8. In combination, a rotary filling table including an odd number of filling heads and container supporting means beneath each head, separate sources of containers, means to alternately combine containers from said separate sources into a single line, means to receive containers from said last-mentioned means and to maintain containers in a predetermined position with respect to each other after they are received from said last-mentioned means, said positioning means delivering containers to said container supporting means for filling, and said combining means and said positioning means being driven in synchronism with travel of said filling table.

References Cited in the file of this patent

UNITED STATES PATENTS

| | | |
|---|---|---|
| 1,510,097 | Miller | Sept. 30, 1924 |
| 2,108,522 | Bergmann | Feb. 15, 1938 |
| 2,535,859 | McPherson | Dec. 26, 1950 |
| 2,691,477 | Sabalauskas | Oct. 12, 1954 |